United States Patent [19]

Alfiero et al.

[11] Patent Number: 4,787,203
[45] Date of Patent: Nov. 29, 1988

[54] SHOCK ABSORPTION AND RETENTION MECHANISM

[75] Inventors: Richard G. Alfiero, Hazel Green; Charles T. Bryant, Huntsville, both of Ala.

[73] Assignee: Morton Thiokol, Inc., Chicago, Ill.

[21] Appl. No.: 10,064

[22] Filed: Feb. 2, 1987

[51] Int. Cl.[4] ............................................. F02K 9/00
[52] U.S. Cl. .................................. 60/256; 60/39.823; 411/524
[58] Field of Search ................ 60/39.823, 223, 253, 60/256, 39.091; 411/521, 524, 512

[56] References Cited

U.S. PATENT DOCUMENTS

| | | | |
|---|---|---|---|
| 2,624,480 | 12/1941 | Owen | 411/521 |
| 3,707,916 | 1/1973 | Meraz, Jr. et al. | 60/256 |
| 4,573,316 | 3/1986 | Carrier et al. | 60/39.823 |
| 4,676,530 | 6/1987 | Nordgren et al. | 411/521 |

Primary Examiner—Louis J. Casaregola
Assistant Examiner—Timothy S. Thorpe
Attorney, Agent, or Firm—Gerald K. White

[57] ABSTRACT

A safety system for protecting a ship and adjacent rocket motor rounds stored in the ship from a rocket motor inadvertently igniting includes a shock absorption and retention mechanism that is operative to catch and hold the igniter during inadvertent ignition and thereby prevent the igniter from blocking the rocket motor forward exhaust port which would eliminate the thrust neutral condition of the safety system and allow the rocket motor to break free from the fixture holding it and jeopardize the safety of the ship.

12 Claims, 2 Drawing Sheets

U.S. Patent  Nov. 29, 1988  Sheet 1 of 2  4,787,203
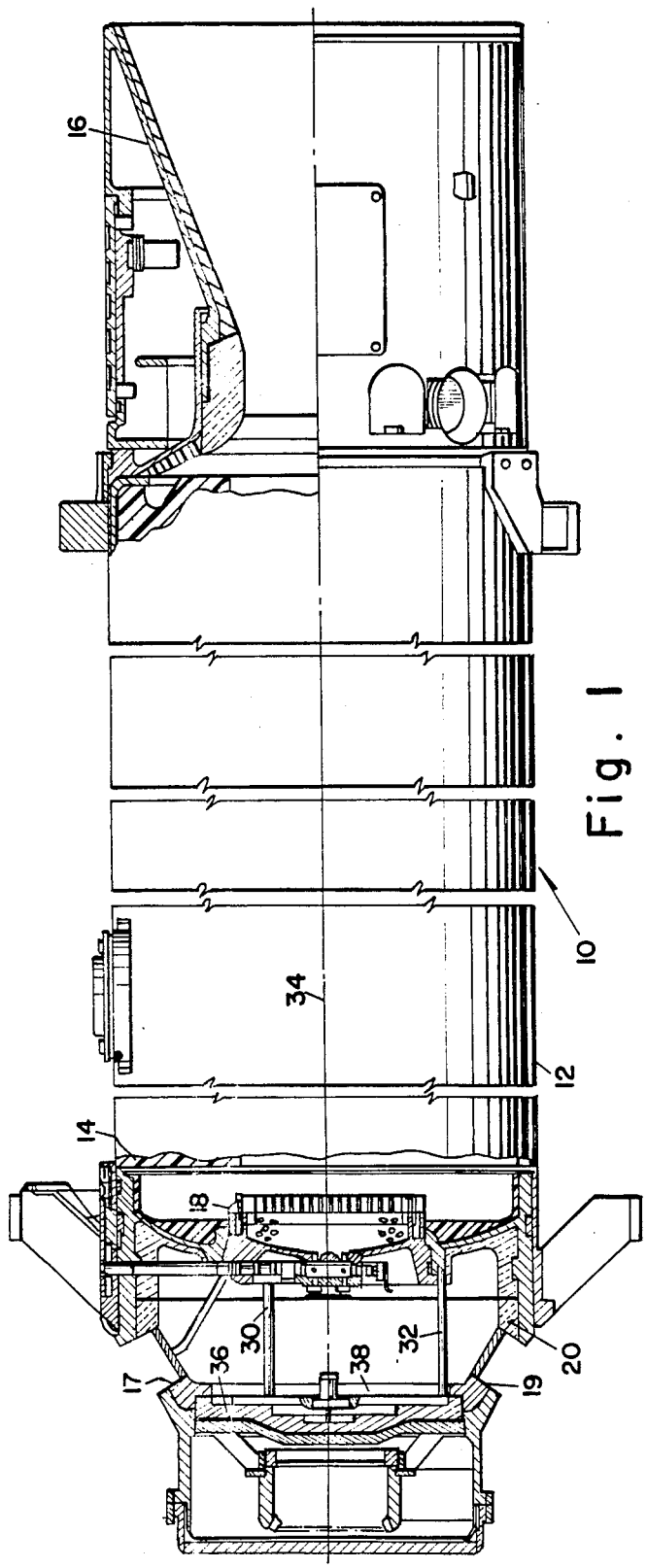
Fig. 1
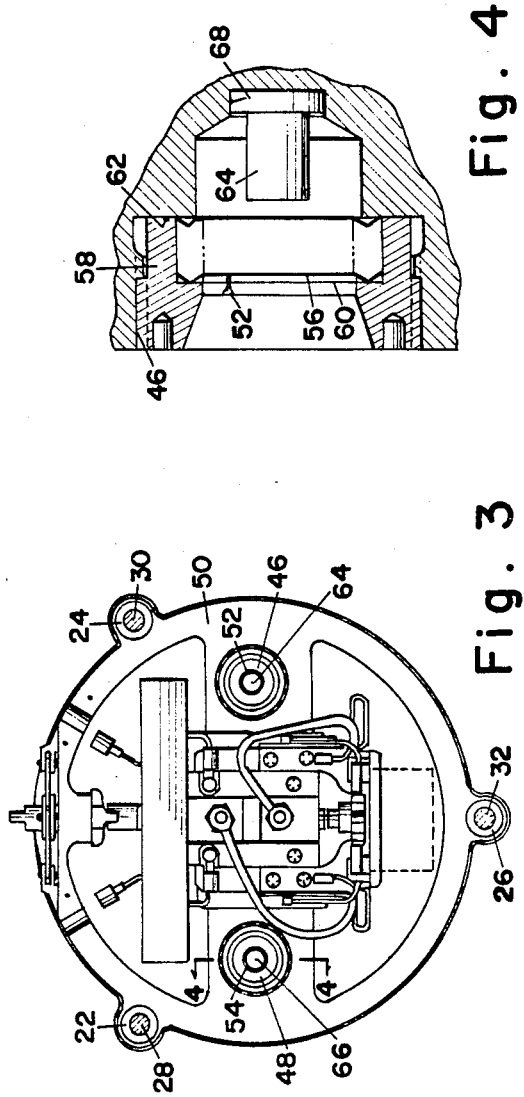
Fig. 4
Fig. 3
Fig. 2

SHOCK ABSORPTION AND RETENTION MECHANISM

The Government has rights in this invention pursuant to Contract No. N00024-81-C-5127 awarded by the U.S. Navy.

BACKGROUND OF THE INVENTION

1. Field of the Invention

This invention relates to a retention mechanism for stopping and retaining a heavy moving part against a bulkhead or stop. The invention has particular utility in a safety system for protecting a ship and adjacent rocket motor rounds stored therein from a rocket motor booster accidentally or inadvertently igniting.

2. Description of the Prior Art

Ship safety requirements for accidental or inadvertent booster ignition of a rocket motor demand maintenance of the thrust neutral condition for the motor. This is to ensure that, in the event of unintended booster ignition, the rocket motor will not break free of the fixture in which it is held and thus jeopardize the safety of the ship and adjacent rocket motor rounds stored in the ship.

The prior art rocket motor booster systems have failed to meet these safety requirements. This failure has been due to the igniter of the rocket motor, upon unintended booster ignition, coming free from its retention or support structure. The free igniter is propelled from one position to another by the gaseous flows resulting from booster ignition, and tends to rebound to block a forward vent or exhaust port of the rocket motor and thereby cause an abnormally high motor pressure and consequent development of thrust sufficient to cause the rocket motor to break free from the fixture holding it.

Thus, there is a need and a demand for an improved igniter retention mechanism or structure that will catch and hold the igniter upon unintended ignition of the rocket motor thereby to prevent the igniter from blocking the forward exhaust port of the moor.

SUMMARY OF THE INVENTION

An object of the invention is to provide a shock absorption and retention mechanism that is operative to stop and retain a heavy moving part against a bulkhead or stop with no rebound.

A specific object of the invention is to provide a shock absorption and retention mechanism that is operative during accidental or inadvertent ignition of a rocket motor to catch and to hold, with no rebound, the igniter of the rocket motor on alignment pins and against a forward motor bulkhead or closure plate, thereby to prevent the igniter from being shifted by the gaseous flows to a position in which it may block a forward exhaust vent or port of the rocket motor, and as a result, to maintain a desired thrust neutral condition of the motor.

In accomplishing these and other objectives of the invention, there is provided a shock absorbing and retention mechanism comprised of two copper slugs for absorbing and reducing the kinetic energy of the rocket motor igniter or other heavy moving part. A plurality of external self-locking rings associated with each of the copper slugs are arranged to grab an individually associated one of two alignment pins that are mounted on the rocket motor forward closure plate or other bulkhead or stop to hold the igniter or other heavy moving part against the closure plate or bulkhead with no rebound.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

Having summarized the invention, a detailed description follows with reference being made to the accompanying drawings which form part of the specification, of which:

FIG. 1 is a schematic side view, with portions shown in cross section, of a rocket motor including at the forward end thereof an adapter that encloses an absorption and retention mechanism according to the invention;

FIG. 2 is an external front view of the adapter of FIG. 1 showing two spaced radially outboard vents or exhaust ports therein;

FIG. 3 is a schematic plan view, on an enlarged scale, of the igniter of the rocket motor of FIG. 1, as seen from the forward end;

FIG. 4 is a cross sectional view, on an enlarged scale, taken on the lines 4—4 of FIG. 3;

DESCRIPTION OF THE PREFERRED EMBODIMENT

Figure 5:
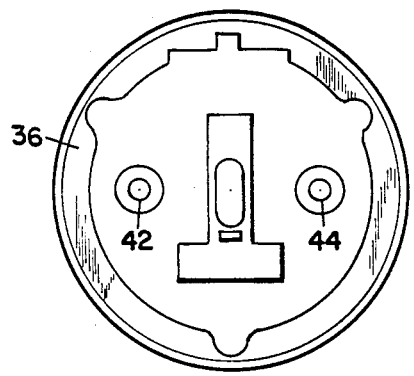
FIG. 5 is a view, on an enlarged scale, of the inner face or side facing the igniter of an adapter closure plate.

Referring to FIG. 1 there is shown a solid propellant rocket motor designated generally by numeral 10. Motor 10 which is held in a suitable fixture, includes a case 12 containing a solid propellant 14 therein and having a nozzle 16 at the aft end and an igniter 18 at the forward end. An adapter unit 20 encloses the forward end of the motor 10 and forms a forward bulkhead structure therefor.

Typically, motor 10 has a "SAFE" and an "ARMED" condition. When adjusted to the ARMED condition, the igniter 18 may be actuated upon command to ignite the solid propellant 14 for intended or planned operation of motor 10. The present invention is not concerned, however, with the ARMED condition. Hence, the motor structure enabling that condition will not further be described herein.

In the SAFE condition of the motor 10, the igniter 18 is held in place by three aluminum shear washers 22, 24 and 26 and three retention and guide rods 28, 30 and 32 that extend toward the closure plate 36, parallel to the longitudinal axis 34 of motor 10, and arranged in cooperative sliding relation therewith. Retention and guide rods 28, 30 and 32 are rigidly secured, as by screw thread means to the adapter 20.

Adapter 20 is arranged to vent or exhaust booster gases radially outboard through two oval shaped ports 17 and 19 centered about 0° and 180° (relative to launch shoes), as shown in FIG. 2. Suitable plug means may be provided to close the ports 17 and 19 to protect the interior of adapter 20 from the environment.

Under booster venting conditions, the total exhaust area consists of the throat area of nozzle 16 and the combined areas of the adapter ports 17 and 19. The relative sizes of these areas are so selected as to provide a desired thrust neutral condition for rocket motor 10 upon accidental or inadvertent booster ignition. Blocking of either of the ports 17 and 19 by the loosely guided igniter 18 upon unintended booster ignition eliminates the thrust neutral condition of motor 10 that is desired upon such occurrence. This allows the rocket motor 10 to break away from the holding fixture therefor and thereby jeopardize the safety of the ship in which the rocket motor 10 is stored and the safety, also, of adjacent rocket motor rounds stored in the ship.

In accordance with the invention, a shock absorption and retention mechanism 40 is provided to catch and to hold the igniter 18 upon accidental or inadvertent booster ignition, thereby to prevent igniter 18 from blocking the ports 17 and 19.

Figure 6:
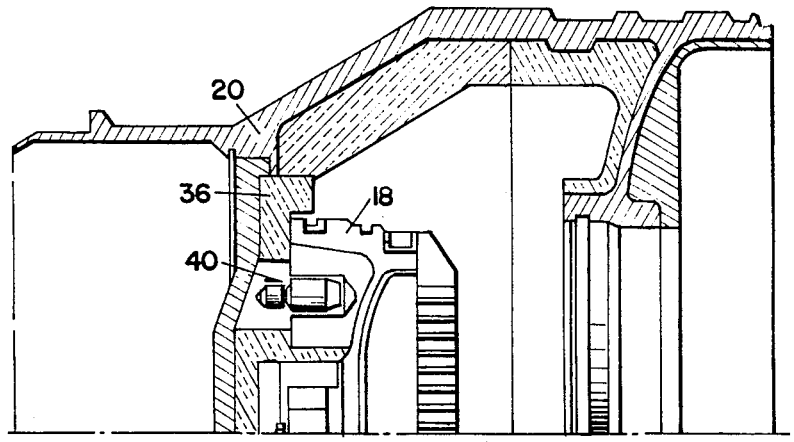
FIG. 6 is a cross sectional view, on an enlarged scale, of the adapter rotated 90° from the position shown in FIG. 1 and showing the igniter retained on alignment pins that protrude from the adapter closure plate.

During accidental or inadvertent ignition of motor 10, pressure builds up in the motor case 12 shearing the shear washers 22, 24 and 26 and sending or propelling the igniter 18 forward along the igniter retention and guide rods 28, 30 and 32 onto the closure plate 36, as shown in FIG. 6. Desirably, the adjacent surfaces of igniter 18 and closure plate are both flat and thus complement each other to the end that there may be close engagement when igniter 18 is moved forward onto closure plate 36. In FIG. 6 the igniter retention and guide rods 28, 30 and 32 have been omitted for convenience of illustration.

In an operative embodiment of the invention, assuming the igniter does not ignite, the force that the igniter would have when the shear washers shear is about 24,600 pounds. The igniter weighs approximately 23 pounds. Part of this force is absorbed by the insulated closure plate 36 while the rest is absorbed by the shock absorption and retention mechanism 40.

By reference to FIGS. 1, 3 and 5, it will be seen that the shock absorption and retention mechanism 40 includes two similar spaced alignment and retaining pins 42 and 44 that are rigidly secured to and extend aft of the closure plate 36 of adapter 20. Pins 42 and 44 preferably are made of steel 1018 through 1035 IAW ASTM A108 normalized and cold finished.

Each of the alignment and retaining pins 42 and 44 is arranged to be received within a respectively associated one of two similar spaced recesses 46 and 48 that are provided in the igniter forward face 50, as best seen in FIGS. 3 and 4. Contained within each of the recesses 46 and 48 of igniter face 50 is a stack, designated 52 and 54, respectively, of external self-locking catcher rings 56 for grabbing and retaining the individually associated one of the pins 42 and 44 when received therein. The internal diameter and configuration of each of the self-locking catcher rings 56 are so selected, as best seen in FIGS. 4 and 9, to allow relatively unrestricted entry of an alignment 42 or 44 therein upon movement of igniter 18 toward closure plate 36 of adapter 20, but arranged to strongly resist withdrawal therefrom.

Figure 9:
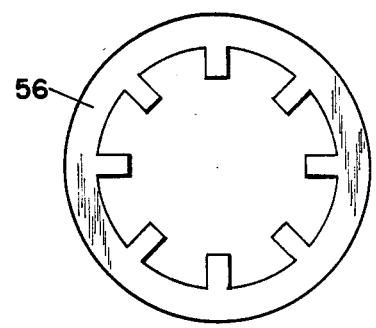
FIG. 9 is a detail plan view of a retaining ring according to one embodiment of the invention.

In a preferred embodiment of the invention, there are fourteen self-locking catcher rings 56, with each ring 56 having a configuration as shown in FIGS. 4 and 9, in each of the stacks of rings 52 and 54. The rings 56 may be made of a suitable metal, for example, phosphate carbon spring steel.

Each of the stacks 52 and 54 of rings 56 may be retained in the associated recess 46 and 48 by means of an individually associated tubular retainer member 58, as shown in FIG. 4. Thus, retainer member 58 includes an external screw thread that meshes with an internal screw thread provided in recess 46. Stack 52 of rings 56 is captured within the retainer member 58. Thus, a peripheral region of one end of the stack 52 is disposed in engagement with an inner shoulder 60 of retainer 58. The other end of stack 52 of rings 56 is disposed in engagement with an inwardly stepped shoulder 62 of recess 46, with the associated end of retainer 58 also in engagement with the stepped shoulder 62.

Also contained within an inner central location of each of the recesses 46 and 48 is an individually associated copper slug 64 and 66. Copper slugs 64 and 66 desirably may be comprised of copper alloy C110000 with Rockwell hardness, F scale of 82 to 87 IAW QQ-C-502. Each of the copper or other suitable metallic slugs 64 and 66 may be retained in any suitable manner within the recess 46 and 48 associated therewith, as for example, by being press fit or bonded within an individually associated and smaller recess 68, as shown in FIG. 4. The copper slugs 64 and 66 are provided to absorb and reduce the kinetic energy of the igniter 18 when the latter breaks free of the fixture holding it, as described above, to a point where the two stacks 52 and 54 of external self-locking rings 56 can grab the associated alignment pin 42 and 44 mounted on the adapter closure plate 36 and hold the igniter 18 against the face 38 of the closure plate 36 with no rebound.

Figure 8:
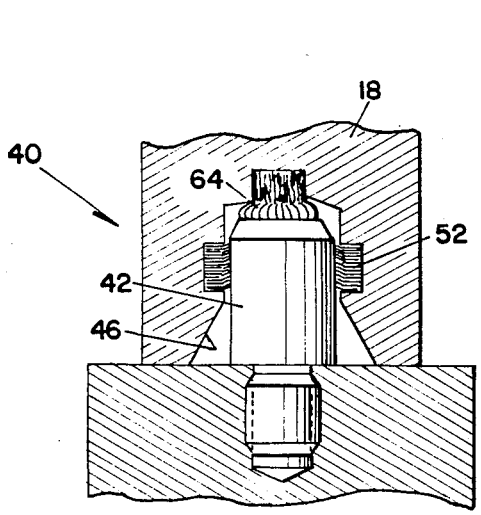
FIG. 8 is a fragmented detail view, similar to FIG. 7, showing the igniter retaining rings, and hence, the igniter, caught on and retained by the alignment pin against the adapter closure plate.
Figure 7:
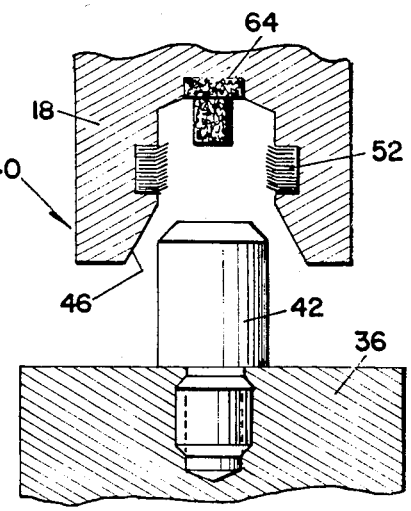
FIG. 7 is a fragmented detail view of the shock absorption and retention mechanism, according to the invention, showing an alignment pin carried by the adapter closure plate about to be engaged by retainer rings located in a recess in the igniter.

Desirably, as shown in FIGS. 4, 7 and 8, the recesses 46 and 48 are flared at the openings thereof to facilitate reception of the associated alignment pins 42 and 44 therein. The fragmented view of FIG. 7 shows one of the alignment pins, pin 42, about to be received within a flared opening of the associated recess 46. The fragmented view of FIG. 8 shows the mass comprising the igniter 18 as having been caught on the alignment pin 42 and as bearing against the closure plate 36, with the copper slug 64 being shown crushed within the recess 46 between the pin 42 and the body of igniter 18.

Thus, in accordance with the invention, there has been provided a safety system that is operative to protect a ship and adjacent rocket motor rounds stored in the ship from a rocket motor accidentally or inadvertently igniting. The shock absorption and retention mechanism 40 catches and holds the igniter 18 during accidental or inadvertent ignition of the rocket motor 10 and prevents the igniter from blocking one or the other of the forward exhaust ports 17 or 19 of the rocket motor 10. Such blockage would eliminate the thrust neutral condition of the safety system and allow the rocket motor 10 to break free of its holding fixture and thereby jeopardize the safety of the ship.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims.

What is claimed is:

1. A shock absorption and retention mechanism for stopping and retaining a moving part against a bulkhead comprising, a bulkhead, an object movable toward said bulkhead, said object having a side facing said bulkhead, at least one pin protruding from said bulkhead toward said movable object, a plurality of external self-locking rings, at least one metallic slug, and at least one recess in said side of said movable object facing said bulkhead, said recess having an inner centrally located region and including said plurality of self-locking rings captured in stacked arrangement therein with said metallic slug held in said centrally located region thereof, the configuration and internal diameter of said self-locking rings being such as to allow relatively unrestrained entry therein of said restraining pin but arranged to strongly resist withdrawal therefrom, whereby, upon movement of said movable object toward said bulkhead and entry of said retaining pin into said recess, said metallic slug is crushed by engagement therewith of said retaining pin thereby effecting absorption of kinetic energy of said movable object and said movable object is retained against said bulkhead by said self-locking rings grabbing said retaining pin with no rebound.

2. A shock absorption and retention mechanism as defined in claim 1 wherein there are two similar retaining pins positioned in spaced relation on said bulkhead and protruding therefrom in parallel relation toward said movable object, and wherein there are two similar spaced recesses in said side of said movable object facing said bulkhead with the spacing thereof being substantially the same as the spacing of said retaining pins and with each of said recesses having a plurality of self-locking rings captured therein and a metallic slug in a centrally located inner region thereof.

3. A shock absorption and retention mechanism as defined by claim 2 further including means for guiding said movable object in the movement thereof toward said bulkhead.

4. A shock absorption and retention mechanism as defined by claim 3 wherein said means for guiding said movable object in the movement thereof toward said bulkhead includes rigidly supported guide rod means extending toward said bulkhead in cooperative sliding relation therewith, and wherein each of said recesses includes a flared opening for facilitating the movement thereinto of the associated retaining pin.

5. A shock absorption and retention mechanism as defined by claim 4 wherein each of said retaining pins is made of steel, each of said self-locking rings is made of spring steel, and each of said metallic slugs is made of a copper alloy.

6. A shock absorption and retention mechanism as defined by claim 5 wherein there are fourteen self-locking rings positioned and rigidly held in stacked arrangement in each of said recesses.

7. A shock absorption and retention mechanism as defined by claim 6 wherein said bulkhead comprises a closure plate of an adapter unit provided at the forward end of a solid propellant rocket motor, said adapter unit having at least one port therein for venting a gaseous flow upon accidental ignition of the solid propellant rocket motor, and wherein said movable object comprises an igniter provided in the solid propellant rocket motor at a position forward thereof but aft of the closure plate of said adapter unit, said igniter being propelled forward, guided by said guide rods, by gaseous flows resulting from accidental ignition of the solid propellant rocket motor and tending when so propelled forward to rebound and block the port in the adapter unit, whereby said igniter when so propelled toward the closure plate of the adapter unit and resulting entry of said retaining pins into the recesses provided therein is grabbed and held against the closure plate with no rebound and thereby prevented from blocking the port in the adapter unit.

8. A shock absorption and retention mechanism for stopping and retaining the igniter of a solid propellant rocket motor to prevent the igniter from blocking a forward port provided in solid propellant rocket motor for venting a gaseous flow upon accidental ignition thereof, comprising, a solid propellant rocket motor having an igniter located at a forward position thereof, said igniter having a forward surface, an adapter unit having a closure plate forming a forward bulkhead for the solid propellant rocket motor said adapter unit being attached to said rocket motor at a position forward thereof and adjacent said igniter, said adapter unit having at least one port therein for venting gaseous flows resulting from accidental ignition of said rocket motor, a plurality of external locking rings, at least two metallic slugs, at least two similar alignment and retaining pins rigidly supported in spaced relation on said closure plate of said adapter unit and protruding therefrom in parallel relation toward said igniter, the forward surface of said igniter complementing that of said closure plate of said adapter and having at least two spaced similar recesses therein with the spacing thereof being substantially the same as the spacing of said retaining pins with each of said recesses including a plurality of said self-locking rings arranged in stacked relation therein and having a centrally located inner recess therein with an individually associated one of said metallic slugs held therein, the configuration and internal diameter of each of said self-locking rings being such as to allow relatively unrestrained entry therein of each of said retaining pins but arranged to strongly resist withdrawal therefrom, whereby upon movement of said igniter toward the closure plate of said adapter unit and entry of each of said retaining pins into an associated one of said recesses in said igniter each of said metallic slugs is crushed by the associated one of said retaining pins thereby effecting absorption of kinetic energy of said igniter, and said igniter is retained against the closure plate of said adapter unit by said self-locking rings grabbing said retaining pins with no rebound.

9. A shock absorption and retention mechanism as defined in claim 8 further including means for guiding said igniter in the movement thereof toward the closure plate of said adapter unit comprising a plurality of guide rods rigidly supported by said adapter and extending toward said closure plate in cooperative sliding relation therewith, and wherein each of said recesses in said igniter includes a flared opening for facilitating the movement thereinto of the associated retaining pin.

10. A shock absorption and retention mechanism as defined by claim 9 wherein there are fourteen self-locking rings arranged in stacked relation in each of said recesses.

11. A shock absorption and retention mechanism as defined by claim 10 wherein said retaining pins are made of steel, said self-locking rings are made of spring steel, and said metallic slugs are made of a copper alloy.

12. A shock absorption and retention mechanism as defined by claim 11 wherein each of said recesses in said igniter includes an inner shoulder, and further including a retaining ring having an inner shoulder in individual association with each of said recesses in said igniter for rigidly holding the associated one of the stacks of self-locking rings therein with the inner peripheral edge of each stack of self-locking rings in engagement with an inner shoulder in the associated recess and with the inner shoulder of the associated retaining ring in engagement with the outer peripheral edge of the associated stack of self-locking rings, each of said retaining rings being retained in the associated recess by being in screw threaded engagement therewith.

* * * * *